United States Patent
Kim

(10) Patent No.: US 8,344,768 B2
(45) Date of Patent: Jan. 1, 2013

(54) DISPLAY DEVICE AND METHOD FOR RECEIVING LOW VOLTAGE DIFFERENTIAL SIGNAL AT DISPLAY DEVICE

(75) Inventor: Sang-Seob Kim, Suwon-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 592 days.

(21) Appl. No.: 12/643,918

(22) Filed: Dec. 21, 2009

(65) Prior Publication Data
US 2010/0164934 A1 Jul. 1, 2010

(30) Foreign Application Priority Data
Dec. 30, 2008 (KR) .................. 10-2008-0136476

(51) Int. Cl.
*H03L 7/00* (2006.01)
(52) U.S. Cl. .................. 327/144; 327/141; 345/213
(58) Field of Classification Search .................. 345/213; 327/141, 144; 375/355, 371
See application file for complete search history.

(56) References Cited

U.S. PATENT DOCUMENTS

| | | | |
|---|---|---|---|
| 6,944,801 B2 * | 9/2005 | Kojima | 714/700 |
| 7,644,296 B1 * | 1/2010 | Burney | 713/401 |
| 2010/0119023 A1 * | 5/2010 | Omote et al. | 375/355 |

* cited by examiner

*Primary Examiner* — Latanya Bibbins
(74) *Attorney, Agent, or Firm* — Sherr & Jiang, PLLC

(57) ABSTRACT

A display device includes a skew compensating type data receiving unit for delaying clocks received in response to a program signal, comparing the clocks delayed thus to compensating clocks, setting an internal delay amount according to a result of the comparison, and delaying and forwarding a low voltage differential signals according to the delay amount set thus, a clock receiving unit for delaying the clock received thus by a fixed delay amount and forwarding the clock delayed thus as a compensating clock, a clock generating unit for generating a data restoring clock by using the clock delayed thus, and a data restoring logic for restoring the low voltage differential signal delayed at the data receiving unit in synchronization with the data restoring clock, thereby compensating for an internal skew taking place at the data channel which receives a low voltage differential signal.

20 Claims, 3 Drawing Sheets

DISPLAY DEVICE AND METHOD FOR RECEIVING LOW VOLTAGE DIFFERENTIAL SIGNAL AT DISPLAY DEVICE

This application claims priority under 35 U.S.C. 119 to Korean Application No. 10-2008-0136476 (filed on Dec. 30, 2008), which is hereby incorporated by reference in its entirety.

BACKGROUND

Recently, there have been sharp increases of panel sizes, numbers of pixels, and operation speeds in products of flat panel display fields. Because of this, a large amount of data is accompanied at the same width, and in order to process the large amount of data within the same time, performance of a receiving device is also required to be improved together with the increases. FIG. 1 illustrates a block diagram of a device for receiving an LVDS (Low Voltage Differential Signal) in related flat panel display fields.

Referring to FIG. 1, the low voltage differential signals [RAP, RAN]~[REP, REN] received at the data channels may be amplified at amplifiers 10 in each stage and forwarded to data restoring logics 20, and inputs of RCLKP and RCLKN received at a clock channel may be amplified at an amplifier 15 and forwarded to a clock generator 30. The low voltage differential signals [RAP, RAN]~[REP, REN] can then be deserialized with clock CLK generated at the clock generator 30, and forwarded as output signals AO~EO.

Referring again to FIG. 1, in an LVDS type serial signal transmission/reception, in which a plurality of data is synchronized to one clock CLK, a skew margin characteristic between the clock and the data which is a data restoring capability on a skew taking place at the data channels is one factor related to a desire for an increase of data transmission speed. In view of the characteristic of the LVDS receiving device in which a plurality of data are synchronized to one clock, the data restoring capability of the receiving device also can be influenced from an amount of the skews generated at respective data channels, directly. However, since related LVDS receiving devices have no means for sensing and compensating for the skew taking place at the channels, such LVDS receiving devices may have problems in that the receiving device is influenced by a layout and arrangements of the channels, and the data restoring capability is reduced as the data transmission speed increases.

Referring to FIG. 1, as an attempt to address the issue described above, manual control delay cells 40 and 45 can be provided additionally to output terminals of the amplifiers 10 and 15 respectively. However, manual control fails to provide accurate control, such that individual compensation for differences of the skews between the data channels may not be possible, and the manual measurement and compensation of the amount of skews causes poor productivity.

SUMMARY

Accordingly, embodiments are directed to a display device and a method for receiving a low voltage differential signal at a display device. Embodiments relate to a display device and a method for receiving a low voltage differential signal at a display device which can sense a skew taking place therein and compensating for the skew automatically for improving a skew margin performance between a clock and a data which is a reference for assessing a capability of data restoration.

Embodiments relate to a display device that includes a skew compensating type data receiving unit for delaying clocks received in response to a program signal, comparing the clocks delayed thus to compensating clocks, setting an internal delay amount according to a result of the comparison, and delaying and forwarding a low voltage differential signals according to the delay amount set thus, a clock receiving unit for delaying the clock received thus by a fixed delay amount and forwarding the clock delayed thus as a compensating clock, a clock generating unit for generating a data restoring clock by using the clock delayed thus, and a data restoring logic for restoring the low voltage differential signal delayed at the data receiving unit in synchronization with the data restoring clock, thereby compensate for an internal skew taking place at the data channel which receives a low voltage differential signal.

In embodiments, the skew compensating type data receiving unit may include a first multiplexer for forwarding one of the clock received thus and the low voltage differential signal in response to the program signal, a first amplifier for amplifying a signal from the multiplexer, a first delay cell for delaying a signal amplified at the amplifier in response to a delay control signal, and a delay controller for comparing the signal delayed at the delay cell and the compensating clock to forward the delay control signal.

According to embodiments, the first multiplexer may forward the clock received in response to the program signal at an initial operation. Also, the first delay cell may be set to be delayed by a delay amount one half of a total delay amount at an initial stage.

According to embodiments, the delay controller calculates a difference of delay between the signal delayed at the first delay cell and the compensating clock at the initial stage, and forwarding information calculated thus as the delay control signal. Also, the clock receiving unit may include a second multiplexer for forwarding the clock received, in response to the program signal; a second amplifier for amplifying a signal from the second multiplexer; and a second delay cell for delaying the signal amplified at the second amplifier and forwarding the signal delayed thus as the compensating clock.

According to embodiments, the second delay cell may be set to be delayed by a delay amount the same with a delay amount of the first delay cell. Also, the second delay cell can delay the signal amplified at the second amplifier with delay amounts different from one another for forwarding a plurality of clocks as the compensating clocks.

According to embodiments, the clock generating unit may generate the data restoring clock by using a clock delayed in a center delay amount of the plurality of clocks delayed in delay amounts different from one another. Also, the clock receiving unit may further include a buffer for buffering and forwarding the plurality of clocks delayed in delay amounts different from one another to the delay controller.

Embodiments relate to a method for receiving a low voltage differential signal at a display device that includes the steps of receiving a clock at a data channel in response to a program signal for amplifying and delaying the clock, and receiving the clock at a clock channel for amplifying and delaying the clock, for forwarding the clock delayed and amplified thus as a plurality of compensating clocks having delay amounts different from one another, comparing the clock amplified and delayed at the data channel and the plurality of compensating clocks for forwarding a delay control signal, receiving the low voltage differential signal from the data channel in response to the program signal, amplifying the low voltage differential signal, and delaying the low voltage differential signal under the control of the delay control signal, generating a data restoring clock by using one of the compensating clocks, and restoring the low voltage differential signal amplified and delayed thus in synchronization with the data restoring clock.

According to embodiments, the clock amplified and delayed at the data channel may be compared to a clock having a center delay amount of the plurality of compensating clocks, and the delay control signal is forwarded for compensating a difference of the comparison. Also, the clock received at the data channel and the clock received at the clock channel may be delayed at delay cells having the same delay amounts set thereto, respectively. The data restoring clock may be generated from a clock having a center delay amount of the compensating clocks.

DRAWINGS

DESCRIPTION

Figure 1:
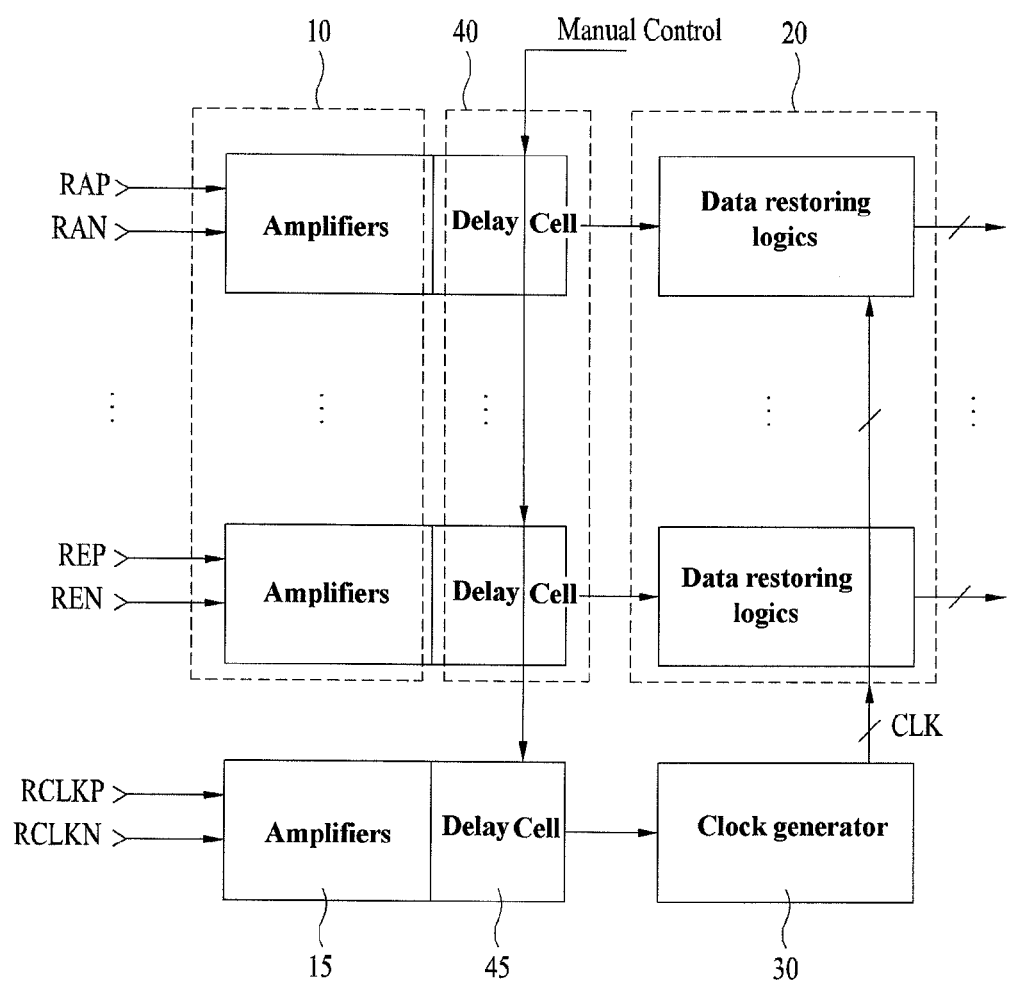
FIG. 1 illustrates a block diagram of a device for receiving an LVDS (Low Voltage Differential Signal) in related flat panel display fields.
Figure 2:
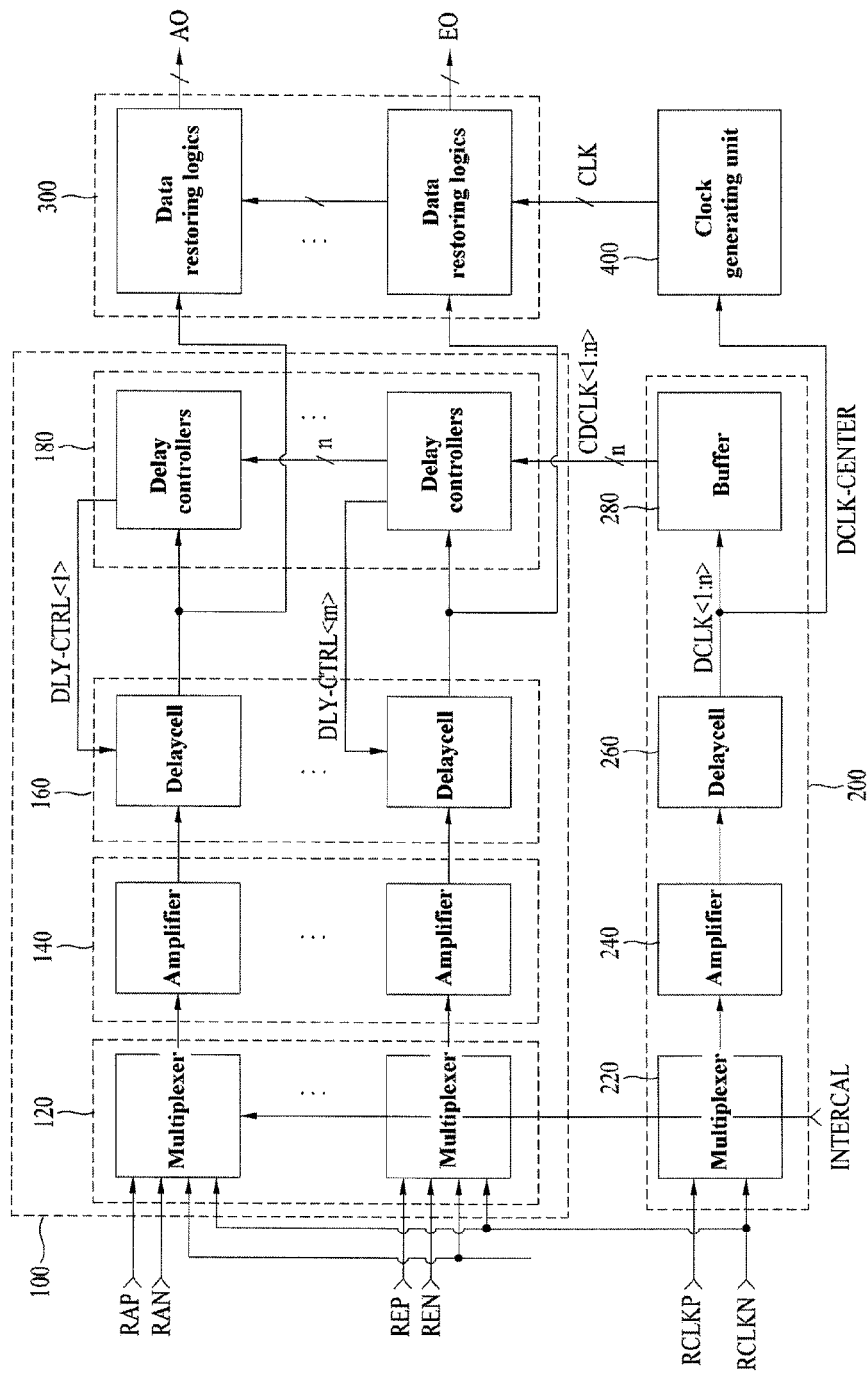
FIG. 2 illustrates a block diagram of a display device in accordance with embodiments.

Embodiments relate to a display device which sets an amount of delay coming from an amount of skew by using a clock at an initial stage for receiving an LVDS to restore a data. Referring to FIG. 2, the display device includes a skew compensating type data receiving unit 100, a clock receiving unit 200, a plurality of data restoring logics 300, and a clock generating unit 400.

A skew compensating type data receiving unit 100 sets an amount of delay such that a delay caused by an inside skew is compensated by using received clocks RCLKP and RCLKN and compensating clocks CDCLK<1:n> received in response to a program signal INTERCAL, and forwards low voltage differential signals [RAP, RAN]~[REP, REN], delaying the low voltage differential signals [RAP, RAN]~[REP, REN] according to the amount of delay set thus.

The skew compensating type data receiving unit 100 may include a plurality of multiplexers 120, a plurality of amplifiers 140, a plurality of delay cells 160, and a plurality of delay controllers 180. Each of the multiplexers 120 selects and forwards one of the received clocks RCLKP and RCLKN and the low voltage differential signals [RAP, RAN]~[REP, REN] in response to the program signal INTERCAL. For example, each of the multiplexers 120 may select and forward the received clocks RCLKP and RCLKN at initial operation in response to the program signal INTERCAL, and then may forward the low voltage differential signals [RAP, RAN]~[REP, REN], thereafter.

Amplifiers 140 may receive and amplify signals from the multiplexers 120 respectively. While delay cells 160 may delay signals from the amplifiers 140 according to the amounts of delays fixed by delay control signals DLY_CTRL1~DLY_CTRLm from the delay controllers 180, respectively. It may be beneficial that the initial delay amounts of the delay cells 160 are set to be one half of a total delay amount.

The delay controllers 180 can compare signals from the delay cells 160 to the compensating clocks CDCLK<1:n> from the clock receiving unit 200, calculate difference values thereof, and forward the difference values as the delay control signals DLY_CTRL1~DLYCTRLm, respectively.

Also, the clock receiving unit 200 may delay the received clocks RCLKP and RCLKN by the fixed delay amount and forward the received clocks RCLKP and RCLKN delayed thus as the compensating clocks<1:n>.

A clock receiving unit 200 may include a multiplexer 220, an amplifier 240, a delay cell 260, and a buffer 280. The multiplexer 220 may forward the received clocks RCLKP and RCLKN in response to the program signal INTERCAL. The multiplexer 220 is provided to the clock receiving unit 200 for making signal delay identical to the signal delay of the multiplexers 120 in the skew compensating type data receiving unit 100.

The amplifier 240 may operate to receive and amplify a signal from the multiplexer 120. The delay cell 260 delays a signal from the amplifier 140 to forward a plurality of delay clocks DCLK<1:n> having different delay amounts. Particularly, it may be beneficial that the delay cell 260 is set to be delayed by a delay amount the same with the delay cells 160 in the skew compensating type data receiving unit 100.

The buffer 280 may buffer the delay clocks DCLK<1:n> from the delay cell 260 and may forward the delay clocks DCLK<1:n> buffered thus as compensating clocks CDCLK<1:n). Also, the data restoring logics 300 may receive signals from the delay cells 160, particularly, signals which are the low voltage differential signals [RAP and RAN]~[REP and REN] amplified and delayed; restore the low voltage differential signals [RAP and RAN]~[REP and REN] so as to be synchronized to the data restoring clock CLK; and forward the signals restored thusly as output signals AO~EO, respectively.

The clock generating unit 400 may receive one of the delay clocks DCLK<1:n>, particularly, a clock DCLK_center having a center delay of the delay clocks DCLK<1:n>, and may generate a restoring clock CLK.

Figure 3:
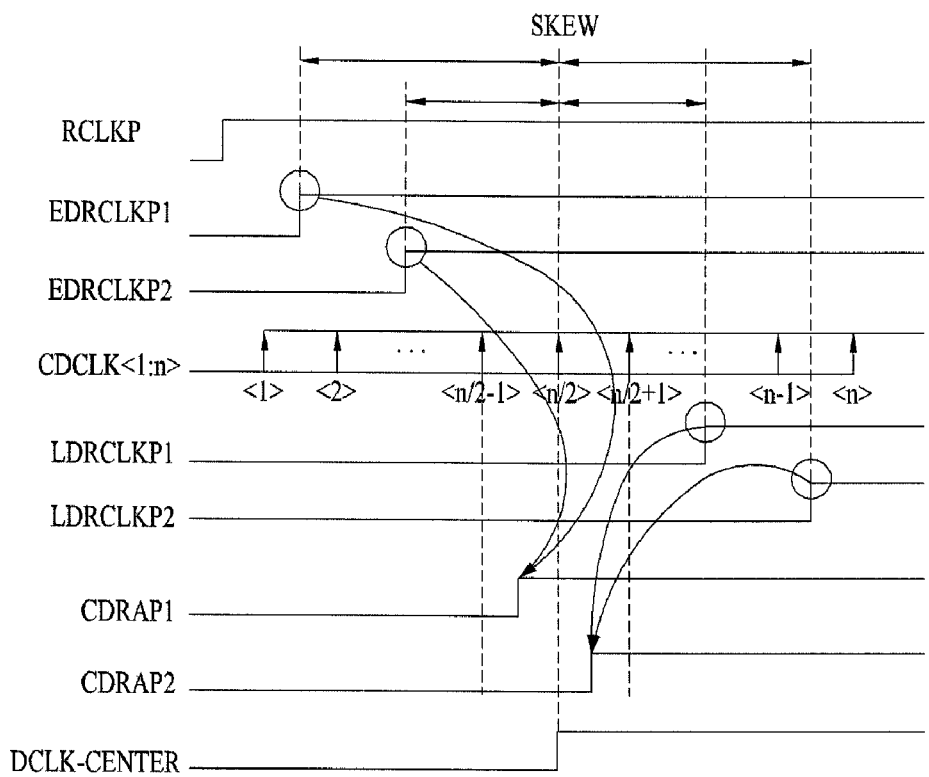
FIG. 3 illustrates signal waveforms in a skew compensation operation of a display device in accordance with embodiments.

A skew compensating operation of the display device at the time of data reception, according to embodiments, will be described with reference to FIGS. 2 and 3. At the time of an initial operation when the clock RCLKP is forwarded through the multiplexer 120, the amplifier 140, and the delay cell 160 in response to the program signal INTERCAL, the clock RCLKP can be forward delayed more or less than a preset delay amount due to an internal skew. That is, though the delay amount set at the first delay cell 160 may correspond to the center delay clock DCLK_CENTER, the clock RCLKP can be forwarded in a clock EDRCLKP1, EDRCLKP2 delayed less than the set delay amount, or a clock LDRCLKP1 or LDRCLKP2 delayed more than the set delay amount due to the internal skew.

The clocks EDRCLKP1, EDRCLKP2, LDRCLKP1, LDRCLKP2 distorted by the internal skew can be compared to the compensating clock CDCLK<1:n> to detect a temporal position of rising edges of the clocks EDRCLKP1, EDRCLKP2, LDRCLKP1, LDRCLKP2. That is, in a case of the clock EDRCLKP1, since the rising edge of the clock EDRCLKP1 may be between the compensating clock CDCLKP<1> and the compensating clock CDCLK<2>, the delay controller 180 can be controlled to generate a delay control signal DLY_CTRL<1:m> which controls the delay amount of the delay cell 160 such that the rising edge of the clock EDRCLKP1 comes closer to a rising edge of the center delay clock DCLKP_CENTER to the maximum. Particularly, if the delay amount of the delay cell 160 is set in response to the delay control signal DLY_CTRL<1:m> which corresponds to the compensating clock CDCLK<n−1> or CDCLK<n−1>, a signal RAP received thereafter can become a delay signal CDRAP1 which has a rising edge closer to the rising edge of the center delay clock DCLK_CENTER at the delay cell 160.

In a case that the clock EDRCLKP2 is generated due to the internal skew, the delay amount of the delay cell 160 is controlled in response to the delay control signal DLY_CTRL<1:m> which corresponds to the compensating clock CDCLK<n−1> or CDCLK<n>, a signal RAP received thereafter can become a delay signal CDRAP1 which has a rising edge come closer to the rising edge of the center delay clock DCLK_CENTER at the delay cell 160.

Also, if the clocks LDRCLKP1 or LDRCLKP2 are generated due to an internal skew, the delay amount of the delay cell 160 can be controlled in response to the delay control signal DLY_CTRL<1:m> which corresponds to the compensating clock CDCLK<1> or CDCLK<1>. A signal RAP received thereafter can become a delay signal CDRAP2 which has a rising edge closer to the rising edge of the center delay clock DCLK_CENTER at the delay cell 160.

Thus, the display device according to embodiments performs an operation for calculating and setting a delay amount for making skew compensation for a time period before receiving and restoring the low voltage differential signal. This is because the skew taking place at an inside has an amount which is not related to a data pattern, and does not vary with a temperature and time, thus that amount does not require to detection and compensation in real time.

Particularly, by generating a plurality of compensating clocks having various delay amounts through a clock channel, and setting compensating delay amounts of the skew by the compensating clocks, an influence from the skew can be minimized at the time of reception of the low voltage differential signal. In this instance, a process of the skew compensation can be made in response to the program signal received at an initial stage automatically, and performed independently at each of the channels.

As has been described, the display device and method for receiving a low voltage differential signal at a display device have advantages. The sensing and compensating of the internal skew can reduce influences of the skew on the layout and arrangement of the channels, not making a data restoring capability poor even if the transmission rate is high. The sensing, measurement of an amount, and compensation of the internal skew can be made automatically, performance of products can be improved by improvement of productivity and accurate skew compensation.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. A display device comprising:
a skew compensating type data receiving unit for delaying clocks received in response to a program signal, comparing the clocks delayed thus to compensating clocks, setting an internal delay amount according to a result of the comparison, and delaying and forwarding a low voltage differential signals according to the delay amount set thus;
a clock receiving unit for delaying the clock received thus by a fixed delay amount and forwarding the clock delayed thus as a compensating clock;
a clock generating unit for generating a data restoring clock by using the clock delayed thus; and
a data restoring logic for restoring the low voltage differential signal delayed at the data receiving unit in synchronization with the data restoring clock.

2. The device of claim 1, wherein the skew compensating type data receiving unit includes:
a first multiplexer for forwarding one of the clock received thus and the low voltage differential signal in response to the program signal,
a first amplifier for amplifying a signal from the multiplexer,
a first delay cell for delaying a signal amplified at the amplifier in response to a delay control signal, and
a delay controller for comparing the signal delayed at the delay cell and the compensating clock to forward the delay control signal.

3. The device of claim 2, wherein the first multiplexer forwards the clock received thus in response to the program signal at an initial operation.

4. The device of claim 3, wherein the first delay cell is set to be delayed by a delay amount substantially one half of a total delay amount at an initial stage.

5. The device of claim 4, wherein the delay controller calculates a difference of delay between the signal delayed at the first delay cell and the compensating clock at the initial stage, and forwarding information calculated thus as the delay control signal.

6. The device of claim 2, wherein the clock receiving unit includes:
a second multiplexer for forwarding the clock received thus in response to the program signal,
a second amplifier for amplifying a signal from the second multiplexer, and
a second delay cell for delaying the signal amplified at the second amplifier and forwarding the signal delayed thus as the compensating clock.

7. The device of claim 6, wherein the second delay cell is set to be delayed by a delay amount substantially the same with a delay amount of the first delay cell.

8. The device of claim 7, wherein the second delay cell delays the signal amplified at the second amplifier with delay amounts different from one another for forwarding a plurality of clocks as the compensating clocks.

9. The device of claim 8, wherein the clock generating unit generates the data restoring clock by using a clock delayed in a center delay amount of the plurality of clocks delayed in delay amounts different from one another.

10. The device of claim 8, wherein the clock receiving unit further includes a buffer for buffering and forwarding the plurality of clocks delayed in delay amounts different from one another to the delay controller.

11. A method comprising:
receiving a clock at a data channel in response to a program signal for amplifying and delaying the clock, and receiving the clock at a clock channel for amplifying and delaying the clock, for forwarding the clock delayed and amplified thus as a plurality of compensating clocks having delay amounts different from one another;
comparing the clock amplified and delayed at the data channel and the plurality of compensating clocks for forwarding a delay control signal;
receiving a low voltage differential signal from the data channel in response to the program signal, amplifying the low voltage differential signal, and delaying the low voltage differential signal under the control of the delay control signal;
generating a data restoring clock by using one of the compensating clocks; and restoring the low voltage differential signal amplified and delayed thus in synchronization with the data restoring clock.

12. The method of claim 11, wherein the clock amplified and delayed at the data channel is compared to a clock having a center delay amount of the plurality of compensating clocks, and the delay control signal is forwarded for compensating a difference of the comparison.

13. The method of claim 11, wherein the clock received at the data channel and the clock received at the clock channel are delayed at delay cells having substantially the same delay amounts set thereto, respectively.

14. The method of claim 11, wherein the data restoring clock is generated from a clock having a center delay amount of the compensating clocks.

15. A display device comprising:
   a skew compensating type data receiving unit for delaying clocks received in response to a program signal, comparing the clocks delayed thus to compensating clocks, setting an internal delay amount according to a result of the comparison, and delaying and forwarding a low voltage differential signals according to the delay amount set thus, wherein the skew compensating type data receiving unit includes:
      a first multiplexer for forwarding one of the clock received thus and the low voltage differential signal in response to the program signal,
      a first amplifier for amplifying a signal from the multiplexer,
      a first delay cell for delaying a signal amplified at the amplifier in response to a delay control signal, and
      a delay controller for comparing the signal delayed at the delay cell and the compensating clock to forward the delay control signal;
   a clock receiving unit for delaying the clock received thus by a fixed delay amount and forwarding the clock delayed thus as a compensating clock wherein the clock receiving unit includes:
      a second multiplexer for forwarding the clock received thus in response to the program signal,
      a second amplifier for amplifying a signal from the second multiplexer, and
      a second delay cell for delaying the signal amplified at the second amplifier and forwarding the signal delayed thus as the compensating clock;
   a clock generating unit for generating a data restoring clock by using the clock delayed thus; and
   a data restoring logic for restoring the low voltage differential signal delayed at the data receiving unit in synchronization with the data restoring clock.

16. The device of claim 15, wherein the first multiplexer forwards the clock received thus in response to the program signal at an initial operation.

17. The device of claim 16, wherein the first delay cell is set to be delayed by a delay amount substantially one half of a total delay amount at an initial stage.

18. The device of claim 17, wherein the delay controller calculates a difference of delay between the signal delayed at the first delay cell and the compensating clock at the initial stage, and forwarding information calculated thus as the delay control signal.

19. The device of claim 15, wherein the second delay cell is set to be delayed by a delay amount substantially the same with a delay amount of the first delay cell.

20. The device of claim 19, wherein the second delay cell delays the signal amplified at the second amplifier with delay amounts different from one another for forwarding a plurality of clocks as the compensating clocks.

\* \* \* \* \*